United States Patent Office 2,750,791
Patented June 19, 1956

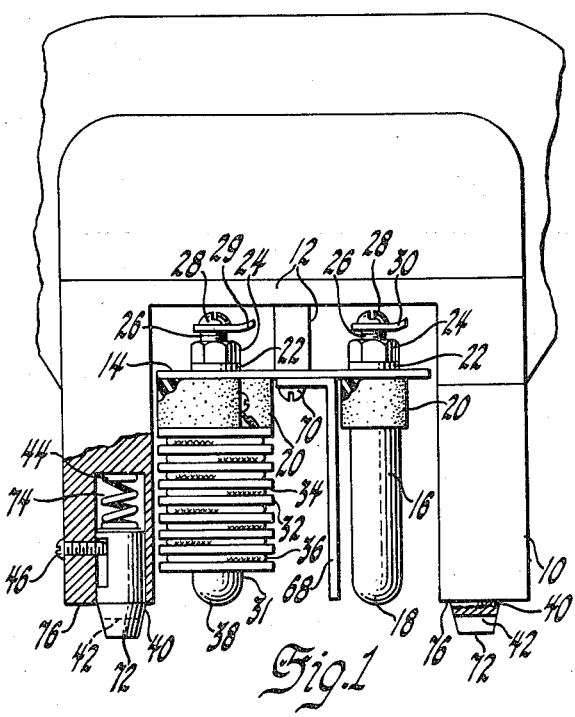

2,750,791

THERMOELECTRIC INSTRUMENT FOR TESTING MATERIALS

Eugene A. Hanysz and Edward F. Weller, Jr., Detroit, Mich., assignors to General Motors Corporation, Detroit, Mich., a corporation of Delaware Application November 6, 1952, Serial No. 319,163

7 Claims. (Cl. 73—15)

This invention relates to improvements in thermoelectric instruments.

Thermoelectric instruments, employed in a variety of applications, operate on the well known thermocouple principle whereby a junction of dissimilar metals will generate a small D. C. voltage whose magnitude is dependent on both the temperature and the thermoelectric properties of the materials forming the junction. Heretofore, thermoelectric instruments have produced results which are often inaccurate and inconsistent because of the difficulty encountered in applying the instrument to a surface with a constant pressure. Since thermoelectric instruments generally are calibrated by comparing the thermoelectric voltage generated with thermoelectric voltages previously obtained by applying the apparatus against known standards, for accurate and consistent results, the instrument should always be applied with the same pressure employed during calibration. Further, with prior thermoelectric instruments it has heretofore been necessary to first thoroughly clean the surface to be contacted by the instrument to remove any oxide, dirt, oil or other coating which otherwise would interfere with the operation of the instrument.

It is a principal object of the present invention to provide a more efficient thermoelectric instrument. A further object is to provide a thermoelectric instrument capable of providing more accurate and consistent results when employed in a variety of applications. These and other objects will more fully appear in the description which follows.

An instrument embodying the present invention consists essentially of a thermocouple probe unit and a support for said probe unit. The thermocouple probe unit comprises a fulcrum member, a spring member, and a plurality of thermocouple probes, capable of having a temperature differential maintained therebetween, secured to said spring member, said spring member supported by means of said fulcrum member. If desired, the support itself may serve as a fulcrum member in lieu of or in addition to a fulcrum member incorporated in the thermocouple probe unit.

A thermoelectric instrument embodying the present invention may be employed either as a compact hand instrument, operated by placing the thermocouple probes in contact with an article or surface, or, if desired, it may be mounted in a vise or other fixture since it operates equally well in any position. A thermoelectric instrument embodying the present invention generally may be used in the sorting of metals or alloys, measuring thicknesses of electroplated coatings, measuring the thicknesses of films of metallic or nonmetallic materials or in any other application for which a thermoelectric instrument ordinarily may be employed.

A thermoelectric instrument formed in accordance with the preferred embodiment of the invention comprises a housing member, carrying retractible article positioning means, supporting a thermocouple probe unit which comprises a leaf spring, secured to said housing member through a fulcrum, said leaf spring carrying at least one thermocouple probe on each side of said fulcrum, a probe heater capable of maintaining a temperature differential between said probes and a heat shield interjacent said probes.

As a thermoelectric instrument embodying the present invention is pressed against a surface, the thermocouple probes mounted on opposite sides of the fulcrum are caused to rub across the surface they contact to provide a clean firm contact. The leaf spring member permits the instrument to be repeatedly applied to a surface with the same pressure each time since the thermocouple probes, in addition to rubbing across the surface as they contact it, will simultaneously retract until a portion of the housing member contacts the surface. Then if any greater pressure is applied, it is transmitted through the housing member to the surface and the pressure with which the thermocouple probes contact the surface does not change. Hence, to obtain a constant thermocouple contact pressure in each application, it is only necessary to apply the instrument against a surface with a pressure at least sufficiently great to cause a portion of the housing member to contact the surface.

Referring now to the drawing:

Figure 1 is a view, partially in section, of a thermoelectric instrument in accordance with one embodiment of the invention.

Figure 2 is a diagrammatic view illustrating movement of the thermocouple probes when they are pressed against a surface.

Figure 3 is a simplified view, partially in section, of a thermocouple probe unit in accordance with one embodiment of the invention.

Figure 4 is a simplified view of a thermocouple probe unit illustrating another embodiment of the invention.

Figure 5 is a simplified view of a thermocouple probe unit illustrating another application of the invention.

Figure 6 is a simplified schematic view of a thermoelectric instrument in accordance with the present invention illustrating a suitable electrical circuit.

Referring more particularly to the figures of the drawing: In Figure 1 is shown, partially in section, a thermoelectric instrument comprising a housing member 10 formed of metal or plastic to which is attached a thermocouple probe unit comprising a fulcrum member 12, formed of steel or other strong material, a heat shield 68 formed of steel or similar material and preferably chromium plated to reduce radiation from the hot probe to the cold probe, a spring leaf member 14 of steel or other strong resilient material whose dimensions are dictated in a particular application by the characteristics of the material and the resiliency desired. At one end of the spring leaf member 14 is a thermocouple probe 16 formed of any material ordinarily employed as a thermocouple lead such as copper, iron, steel, constantan or nickel. The unheated probe 16 has a convexly curved contact surface 18 and is insulated from the spring member 14 by spacers 20 and 22 formed of any suitable electrical insulating material such as Bakelite. The thermocouple probe 16 is secured to the spring leaf member by a a nut 24 engaging a threaded portion 26 of the probe extending through the spring leaf member. At the top of the threaded portion of the probe 26 is a screw 28 forming a terminal to which is attached an electrical lead 30.

At the opposite end of the spring leaf member 14 is a similar thermocouple probe 31 to which is connected electrical lead 29. Thermocouple probe 31 is surrounded for a portion of its length by a finned thermal mass or probe heater 32 formed of brass or other material capable of providing a substantially constant temperature. In the grooves 34 of the probe heater 32 is wound a coil of resistance wire 36 through which an electrical current may be passed to provide a source of heat for thermocouple probe 31. The wire 36 is prevented from contacting the finned section by fiber glass or other suitable high temperature insulating material. In addition to a thermocouple probe unit, which may readily be detached from the housing by removing screw 70, the housing member 10 also carries article centering guides 40 recessed in its legs. In the end surfaces 72 of guides 40 are cut-out portions 42 such as V-shaped cut-outs which serve to readily hold rods or other small diameter articles in a proper position to be contacted by the thermocouple probes. These guides retract automatically as required by the diameter of the article to position the article for proper contact with the probes. If a flat surface is contacted, they will of course retract completely into the housing. As illustrated, partially in section, the article contacting guides 40 are located in openings 74 in the housing member 10 where each guide is biased by a spring 44 against a stop screw 46.

When the thermoelectric instrument is pressed against a surface, the thermocouple probe contact surfaces 38 and 18 move in directions which are opposite and normal to the direction of applied pressure as shown in Figure 2. Simultaneously, the centering guides 40 retract into the housing member. As the pressure is increased, the thermocouple probes and centering guides retract until the ends 76 of the housing member contact the surface with the result that any additional pressure is transmitted to the surface through the housing member and does not vary the probe contact pressure.

In some applications of a thermoelectric instrument the thermocouple probes 16 and 31 may establish thermocouple junctions and hence generate thermoelectric voltages merely by contacting a surface, i. e. where they contact a surface formed of a metal or other electroconductive material which serves to complete the electrical current through the instrument. However, in other applications where the instrument is applied to an electrically nonconductive surface it is necessary, in order to establish thermocouple junctions and to complete the electrical circuit through the instrument, to provide an electroconductive material in contact with the probe contact surfaces 38 and 18. Figures 3, 4 and 5 illustrate, in somewhat schematic form, omitting a heat shield between the probes for clarity, various modifications in accordance with the present invention wherein the thermocouple probes 16 and 31 are electrically connected through thin electroconductive layers in contact with the surfaces 38 and 18 of the probes. Most satisfactory results have been obtained when such an electroconductive layer is very thin, i. e. within the range of about 0.0005" to 0.0015" so that the temperature existing at the thermocouple junction will be substantially the same as the temperature of the surface being contacted. The electroconductive material, of copper, nickel, silver, steel, constantan, aluminum or other material having a high thermal and electrical conductivity, preferably is selected to form, when in contact with a thermocouple probe, a thermocouple junction which will generate as large an E. M. F. as possible at a given temperature. For example, very beneficial results have been obtained by employing thermocouple junctions formed of copper and steel or nickel and copper.

Figures 3, 4 and 5 illustrate a backing member 56 with an electrically nonconductive coating 58 contacted by thermoelectric instruments to establish thermocouple junctions adjacent the surface of the coating. In Figure 3, the electroconductive layer is provided by connecting with a conductor 50 coatings 48 of a metal such as copper or other electrically conductive material electrodeposited on the probe contact surfaces 18 and 38.

Figure 4 illustrates, in a similar application, a modification in which the electroconductive layer between the probe contact surfaces and the electrically nonconductive material 58 is provided by an electrical conductor 52 such as a copper wire, flattened out and joined to the probe contact surfaces 18 and 38 by welding, soldering, etc.

Figure 5 illustrates, in a similar application, another modification in which a thin layer 54 of a metallic foil of copper or other electrically conductive material placed over an electrically nonconductive surface 58 serves both to establish thermocouple junctions with the thermocouple probes and to complete the electrical circuit through the instrument.

Figure 6 illustrates in schematic form an electrical circuit which may be employed with a thermoelectric instrument in accordance with the present invention. In the circuit, thermocouple probes 16 and 31, an electrical measuring device 60 and an electroconductive surface, i. e. as a foil 54 contacted by said probes, are all connected in series. It will be understood, of course, that in certain applications, the electrical circuit between the probe surfaces 18 and 38 will be completed in various ways such as those illustrated in Figures 3, 4 and 5. The coil of resistance wire 36, in a separate electrical circuit, is connected through lead wires 64 and 66 to a source of electrical current at the heater supply 62.

Thus with a temperature differential existing between the probes which are connected in series, thermocouple junctions established at their contact surfaces will generate separate thermoelectric E. M. F.'s which oppose each other. Hence, the resulting differential E. M. F. is not affected by changes in the ambient temperatures or other external conditions since any variation in voltage, which might otherwise be introduced by such a change, will be effectively cancelled out by having the generated voltages oppose each other.

In a preferred embodiment, the lead wires 64, 66, 29 and 30 are all joined in a single shielded cable leading to a unit which includes both an electrical measuring device 60 and a probe heater supply 62.

While any conventional electrical measuring instrument, such as a millivoltmeter or milliammeter, may be employed to indicate the thermoelectric voltages generated at the thermocouple junctions, it is preferred to pass the generated signal first through a D. C.–A. C. converter to a voltage amplifier. The output of the amplifier may then be connected to a phase sensitive detector having a differential thermal E. M. F. meter connected in its cathode circuit. If desired, to improve the uniformity of results, a constant voltage transformer may be used to feed both the amplifier and the probe heater.

Various changes and modifications of the embodiments of the invention described herein may be made by those skilled in the art without departing from the spirit and principles of the invention.

We claim:

1. An instrument for the study of thermal and electrical characteristics of metal objects comprising a leaf spring member, a support therefor, a plurality of spaced probes secured to said leaf spring member, means surrounding at least one of said spaced probes for heating the same to a fixed temperature above that of another of said plurality of spaced probes and an electrical lead connecting each of said plurality of probes to an electrical measuring device, the circuit to said electrical measuring device being completed through said object contacted by the free ends of the plurality of spaced probes during a testing operation, each of the free ends of the probes forming a thermoelectric junction with said object.

2. An instrument for the study of thermal characteristics of materials that are electrically nonconductive comprising a housing member, a leaf spring member secured to said housing intermediate the ends of the spring, two spaced probes secured to said leaf spring member adjacent the ends thereof, means surrounding one of said spaced probes for heating the same to a fixed temperature above that of the other of said spaced probes, and an electrical lead connecting each of the two probes to an electrical measuring device, the circuit to said electrical measuring device including a thin electrically conducting element joining the free ends of the probes during a testing operation, each of the free ends of the probes forming a separate thermoelectric junction with said thin electrically conducting element.

3. A thermoelectric instrument comprising a housing member, a leaf spring secured to said housing intermediate the ends of the spring, two spaced probes secured to said leaf spring member adjacent the ends thereof, means surrounding one of said spaced probes for heating the same to a fixed temperature above that of the other of said spaced probes, a shield between said probes, spring biased article engaging means carried by the housing, and an electrical lead connecting each of the two probes to an electrical measuring device, the circuit to said electrical measuring device being completed through conductive means contacted by the free ends of the probes during a testing operation, each of the free ends of the probes forming a separate thermoelectric junction with its conductive contact.

4. A thermoelectric instrument comprising a housing member, spring biased article contacting means carried by said housing, two spaced probes resiliently mounted in said housing, means surrounding one of said probes for heating it to a fixed temperature above that of the other of said probes, and an electrical lead connecting each of the two probes to an electrical measuring device, the circuit to said electrical measuring device being completed through conductive means contacted by the free ends of the probes during a testing operation, each of the free ends of the probes forming a separate thermoelectric junction with its conductive contact.

5. A thermoelectric instrument comprising a housing member, two spaced probes, resilient means for mounting said spaced probes, means surrounding one of said probes for heating it to a fixed temperature above that of the other of said probes and an electrical lead connecting each of the two spaced probes to an electrical measuring device, the circuit to said electrical measuring device being completed through conductive means contacted by the free ends of the resiliently mounted probes during a testing operation, each of the free ends of the resil mounted probes forming a separate thermoelectric tion with its conductive contact.

6. A thermoelectric instrument comprising a h{c} member provided with spring-biased article cont means, said housing member supporting a thermoc probe unit which comprises a leaf spring secured t{c} housing member through a fulcrum interjacent its and a rigid probe mounted on each end of said leaf s{p} one of said probes having an electric heater capal providing a substantially constant elevated probe te{1} ature surrounding a portion of its length, an elec lead connecting each of the two probes with an elec measuring device, the circuit of said electrical meas device being completed through conductive means tacted by the free ends of the plurality of probes du{1} testing operation, each of the free ends of the probes { ing a thermoelectric junction with its conductive co{1} and a heat shield adjacent the probe not carrying heater, said leaf spring mounting serving to caus{e} probes to move in directions opposite to each othe{1} normal to the direction of applied pressure when th strument is pressed against a surface.

7. A thermoelectric device as in claim 6 in which conductive means is a relatively thin conductive me{1} connecting the free ends of the probes whereby the d may test nonconductive materials.

References Cited in the file of this patent

UNITED STATES PATENTS

| 1,648,939 | Evins | Nov. 15, |
| 1,942,519 | Packard | Jan. 9, |
| 2,279,846 | Stapleton | Apr. 14, |
| 2,323,715 | Kuehni | July 6, |
| 2,446,283 | Hulsburg | Aug. 3, |

FOREIGN PATENTS

| 713,640 | France | Oct. 30, |
| 702,856 | Germany | Feb. 18, |

OTHER REFERENCES

Advertising Bulletin pub. in Instruments, vol. 2{( } 730, August 1947, "Spring Loaded Prod Type The{r} couple Assembly."